(No Model.)
F. B. FINLEY.
CARRYING ATTACHMENT FOR BICYCLES.
No. 568,085. Patented Sept. 22, 1896.
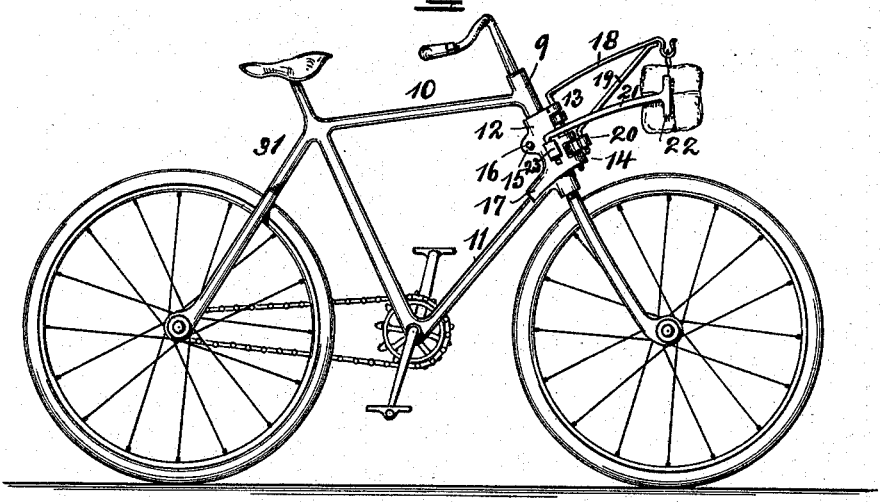
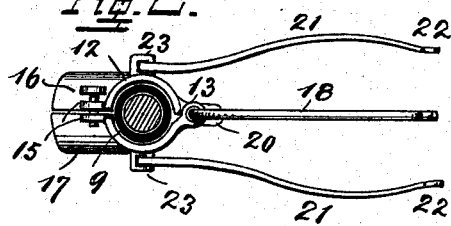
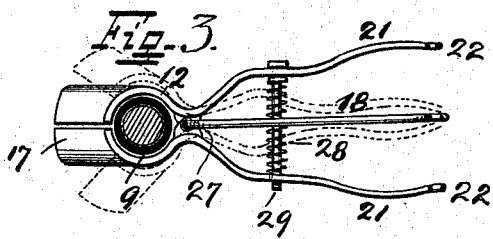
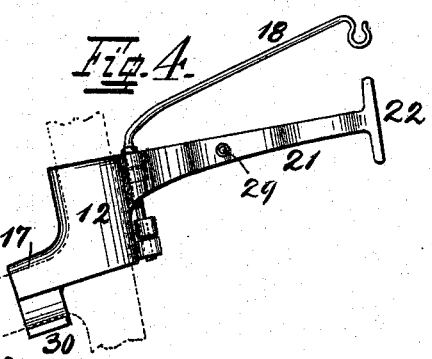
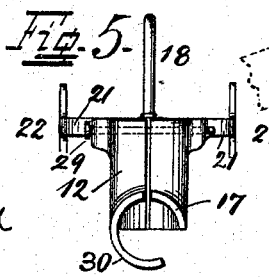
Attest
Jas. A. McDonald
Arthur S. Kline
Inventor
Frederick B. Finley
by C. Spengel Atty.

UNITED STATES PATENT OFFICE.

FREDERICK B. FINLEY, OF CINCINNATI, OHIO.

CARRYING ATTACHMENT FOR BICYCLES.

SPECIFICATION forming part of Letters Patent No. 568,085, dated September 22, 1896.

Application filed October 21, 1895. Serial No. 566,318. (No model.)

*To all whom it may concern:*

Be it known that I, FREDERICK B. FINLEY, a citizen of the United States, and a resident of Cincinnati, Hamilton county, State of Ohio, have invented a certain new and useful Carrying Attachment for Bicycles; and I do declare the following to be a full, clear, and exact description of the invention, such as will enable others skilled in the art to which it appertains to make and use the same, attention being called to the accompanying drawings, with the reference-numerals marked thereon, which form a part of this specification.

The general object of this invention is to provide a carrying attachment for bicycles, whereby packages, parcels, &c., of moderate weight may be conveniently carried without encumbering the hands or person of the rider. In the construction of this attachment the intention was to carry the load in a suspended position, and therefore one of the features is a load-supporting arm adapted to permit the load to be hung thereon. This makes necessary the provision of means to prevent the load from swaying while so suspended, and which would be objectionable while the bicycle is in motion. For this reason additional members or arms are provided, which, while not intended to aid in any way the supporting of the load, prevent the same from swaying from side to side, and which arms form another feature of my improvement. Finally, the invention comprises features relating to the construction in general, as well as to the details, whereby the device is readily attached to the bicycle and held in position thereon.

In the following specification, and particularly pointed out in the claims, is found a full description of my invention, its operation, parts, and construction, which latter is also illustrated in the accompanying drawings, in which—

Figure 1 shows a side elevation of a bicycle with my attachment in position. Fig. 2 is a top view of the device detached. Figs. 3, 4, and 5 are top, side, and rear views, respectively, of the device by itself, showing adaptation of my invention to a modified construction for attaching it in position.

9 is the front upright of the bicycle, to which the device is to be attached and to that part thereof which is between the rearwardly-extending members 10 and 11 of the frame. The device consists, first, of the attaching-sleeve 12 in two halves, hinged, as shown in Fig. 1, at 13 and 14, which allows it to be placed around upright 9, its inner diameter being closely fitted thereto. On the rear or open side each half is provided with a lug 15, one of which carries a set-screw 16, which, when the device is in place, is advanced to enter the screw-threaded hole in the other lug, whereby the sleeve is closed. Turning of the same on upright 9 is prevented by rearward extensions 17 on each sleeve-section, which project at the proper angle to lie against part 11 of the frame, and which, when sleeve 12 is closed, form together a half-sleeve which embraces the upper half of said part 11 of the frame. The load is suspended from the outer hooked end of a forwardly-extending arm 18, the inner part of which is bent downwardly and forms, preferably, the pin for hinges 13 and 14. Sagging of this arm is prevented by a brace 19, which supports the outer end of arm 18 and rests with its inner end in a socket contained in a lug 20, which is formed by an extension forwardly of one of the hinged sections of one of the sleeve-halves. Swaying of the suspended package is prevented by brace-arms 21, which also extend forward and spread at their outer ends, as shown at 22, to increase their purchase with the load, which they engage sidewise. They are preferably removable and rest with their inner square ends in square sockets formed in lugs 23 at the side of each sleeve-half. These arms should be of such material or metal which insures a spring action, so that the outer ends always touch the load, being capable of being spread apart to admit larger packages and closing down upon smaller ones. The parts of the sleeve are preferably of cast metal, while arm 18 and brace 19 may be of steel wire.

In Figs. 3, 4, and 5 a modified construction is shown, the modified features relating particularly to the manner of holding sleeve 12 closed around upright 9, the general combination of the hooked supporting-arms with brace-arms being retained. In this case arms 21 form continuations of the sleeve-halves, which are hinged at 27 in the same manner as before explained. In place of a screw 16 to lock the sleeve-halves around part 9 of the bicycle-frame a compression-spring 28 is used, which normally keeps arms 21 apart and thereby holds the sleeves closed. This spring is sustained on a rod 29, which is fastened to one of the arms 21, but passes loosely through the other one to allow the arms to be pressed together for the purpose of opening the sleeve. The load-supporting arm may form again with its inner end the pin of hinge 27. To counteract the tendency of the lever action of the loaded arm 18 to pry the sleeve open, one of the rearward extensions 17 of the sleeve is continued downwardly to reach partly around member 11 of the frame, as shown at 30 in Figs. 4 and 5. By slight changes in the shape of sleeve 12 and by changing the angle of the extensions thereof the device may be adapted to be attached to the rear upright 31 of the frame. As will be seen, extensions 17, reaching out rearwardly from sleeve 12, prevent the attachment from turning as well as from slipping down on the part of the bicycle-frame to which it is attached. This form of connection obviates the use of any tight-fitting screw-clamps, which deface the bicycle-frame, and is preferable to a connection to the handle, which causes the attachment and load to share in all manipulations of the latter.

Having described my invention, I claim as new—

1. In a device of the kind described, the combination of the attaching-sleeve adapted to be connected to the bicycle-frame, a load-supporting arm connected to it and extending therefrom and two brace-arms below the latter adapted to engage sidewise the load between their free ends to prevent the same from swaying.

2. In a device of the kind described, the combination of the attaching-sleeve in two sections hinged together and formed to fit around a part of the bicycle-frame, means to hold the sleeve-sections closed while in position, a load-supporting arm connected to the sleeve and extending therefrom and two brace-arms below the latter adapted to engage the load sidewise between their free ends to prevent the same from swaying.

3. In a device of the kind described, the combination of the attaching-sleeve in two sections hinged together at 13 and 14, a load-supporting arm 18, connected to the sleeve by forming with its inner end, the pivot-pin of the hinges thereof, part of the lower one of the latter being extended to form a lug 20, containing a socket, a supporting-brace 19, resting in said socket and connecting with its outer end to the outer end of the arm 18 and means to hold the sleeve in position.

4. In a device of the kind described, the combination of the attaching-sleeve in two sections hinged together, lugs 15 thereon, one of which carries a set-screw for connection, extensions 17 on each sleeve-section to prevent the sleeve from turning on its support, a supporting-arm 18, extending from the sleeve, lugs 23 on each side thereof and brace-arms 21 supported in said lugs.

5. In a package-carrying attachment for bicycles, the combination with the means to support the load, of brace-arms adapted to engage the latter sidewise for the purpose of holding it to the position in which it is supported and means whereby all parts are attached to the bicycle-frame.

In testimony whereof I hereunto set my signature in presence of two witnesses.

FREDERICK B. FINLEY.

Witnesses:
C. SPENGEL,
ARTHUR KLINE.